Dec. 4, 1934.   H. HOLZWARTH   1,982,666
APPARATUS FOR CHARGING EXPLOSION CHAMBERS
Filed Nov. 17, 1931   4 Sheets-Sheet 1

Inventor
Hans Holzwarth.

Dec. 4, 1934.  H. HOLZWARTH  1,982,666
APPARATUS FOR CHARGING EXPLOSION CHAMBERS
Filed Nov. 17, 1931  4 Sheets-Sheet 4

Inventor
Hans Holzwarth.

Patented Dec. 4, 1934

1,982,666

UNITED STATES PATENT OFFICE 1,982,666

APPARATUS FOR CHARGING EXPLOSION CHAMBERS

Hans Holzwarth, Dusseldorf, Germany, assignor to Holzwarth Gas Turbine Co., San Francisco, Calif., a corporation of Delaware Application November 17, 1931, Serial No. 575,542
In Germany November 26, 1930

2 Claims. (Cl. 60—41)

My invention relates to the charging of explosion chambers of explosion turbines, and more particularly to an improved method and apparatus for maintaining substantially constant the total heat content per unit weight of the charge of explosion chambers, and particularly of constant volume explosion chambers, such as are employed in gas turbines operating on the explosion cycle, for all conditions of regulation thereof.

In the operation of explosion engines which are operated with difficultly vaporizable oil, it has proved to be necessary to introduce the fuel and the combustion-supporting air separately into the explosion chamber as the fuel tends to separate in the conduits if it is first mixed with the air in advance of the chamber. In such method of operation there exists no direct relation between the introduced fuel and air quantities, in contrast to carburetor engines in which the fuel sucked into the carburetor is directly influenced by the pressure of the air.

The present invention is based upon the recognition that it is extremely important for explosion turbines to create such a relation between the introduced fuel and air quantities in order to maintain the proportion therebetween as constant as possible. The ratio between the fuel and air quantities determines the specific heat content of the charge, that is, the total heat content per unit weight of charge, and such heat content, according to the invention, is to be maintained as constant as possible. A constant specific heat content has the advantage that the temperature of the generated combustion gases remains independent of the load conditions of the machine, and that the flow velocities accordingly remain the same and consequently the rotor efficiency remains unchanged at its optimum value, which heretofore could be maintained only for a single condition of loading, generally the full load.

My invention provides a very simple way of maintaining constant the proportion between the weights of the introduced heavy oil fuel and air, or, what amounts to the same thing, between the introduced fuel and air quantities, preferably measured in normal cubic meters (referred to 0° C. and 760 mm.), for all speeds within the range of regulation of the engine. It is thus the object of the invention to accomplish a proportionate regulation of the quantities of fuel and air fed to an explosion chamber in dependence upon the condition of regulation of the engine. I may accomplish such object by controlling the feed of fuel and air by means of a third fluid, preferably an oil, which I term the regulating oil, whose pressure either determines the degree of regulation of the engine or varies in dependence upon such degree of regulation; or by controlling the feed of fuel by the variable pressure of the charging air itself.

In the embodiments of my invention to be described more in detail below, the variable pressure of the charging air is made to effect automatic adjustment of the oil fuel feed in such manner that specific heat content of the explosive mixture in the combustion chamber is kept substantially constant for all engine speeds. According to this example of my improved process, only the air pressure is changed directly by the controlling mechanism in carrying out the regulation of the turbine; the charging air pressure is then made to act itself upon a member which adjusts the fuel feed correspondingly. Assuming that the temperature at which the explosion chambers are charged remains practically constant, then the introduced quantity of charging air is determined by the pressure at which the chamber is charged with such air. There thus corresponds to a definite value of the air pressure a definite quantity of fuel requisite to produce a definite specific heat content. This interdependence can be readily calculated and the control of the fuel feed by the air pressure correspondingly determined.

Control of the fuel feed directly by the speed regulator, as is common in piston engines, would not lead to the desired result, as variations in the speed of rotation and changes in the air pressure flowing from the carrying out of the regulating process occur asynchronously. It will thus be evident that the automatic control of the fuel feed in dependence upon the charging air pressure according to the invention is much more sensitive than a control thereof directly in response to variations in the speed of revolution, even if it should be possible by the use of curved discs or similar devices to produce synchronization, because in my improved method and apparatus the control by such air pressure is direct whereas in all other cases such control is indirect. Finally, regulation of the fuel feed by the speed regulator of a turbine would not be as reliable as the mode of operation proposed by the present invention, for as soon as disturbances occur in the conduction of the charging air, the quantities of fuel supplied is, according to the present invention, automatically regulated to a corresponding degree; if, for example the supply of charging air should cease, then the feed of fuel likewise ceases. Flooding of the explosion chamber with fuel is thus avoided, whereas, for example in the case of control of the fuel in dependence upon the rotational speed, fuel would be pumped into the chamber even though the supply of charging air should cease, since the turbine would continue the run and the fuel control element would continue to be operated by the turbine; the chamber would thus continue to be filled with fuel, which upon resumption of the air charging would lead to considerable difficulties and even danger.

The mechanism for carrying out my improved mode of regulation is distinguished by the feature that movable adjusting elements are provided which are operated by means of pistons, membranes and similar devices, under the influence of the variable charging air pressure or of the regulating oil, such elements being coupled with the fuel feeding mechanism, or to the fuel and air feeding mechanism, so that fuel quantities are so adjusted either in dependence upon or in proportion to the charging air pressure that a definite specific heat content in the explosive charge, that is, a definite, total heat content per unit weight of charge, is maintained which remains constant independently of variations in the charging air pressure, at least throughout the range of regulation. The members determining the fuel feed are the control mechanism of the valve or slide in the case of gaseous fuels; in the case of liquid fuels they are the mechanism in the fuel pumps which determines the effective plunger lift; in the case of solid or pulverulent fuels they are those elements which determine the quantity of fuel conveyed, as by adjusting the content or volume of a slide or rotary member which feeds definite quantities of such solid fuel intermittently. In the case of a fuel pump for liquid fuels, the adjustable member which is controlled by the variable air charging pressure through a piston, membrane, and so forth, may, for example, rotate an eccentrically journalled shaft which forms the center of oscillation of a lever actuated by the pump plunger and controlling the over-flow member of the pump. By the displacement of the center of oscillation, the over-flow member is opened later or sooner when the duration of the fuel feed is changed, according to whether the quantity of fuel fed must be increased or reduced, for maintaining a definite constant specific heat content in the charge, at least over the range of regulation; the reverse conditions occur when the over-flow member which determines the effective plunger lift varies the instant at which the effective plunger lift begins. What has been said for the over-flow member applies also for all devices operating in similar manner, for example for a mechanism wherein the suction valve simultaneously operates as an overflow valve. Such an arrangement requires, however, the use of a special control device for the piston, membrane or other element which is moved under the influence of the changing charging air pressure.

In a further development of the invention these control devices may be directly connected with the members which determine the fuel feed. For example, in a fuel pump the adjustable body which is moved through a piston under the influence of the varying air pressure can be arranged in the fuel pump itself and form the carrier of the pivots or studs about which an oscillating lever swings which controls the over-flow member of the pump and is preferably actuated by the pump plunger. In such a construction the same conditions occur as though the above-mentioned eccentrically journalled shaft forming the center of oscillation of the swinging lever were rotated, since the pivot, as part of the adjustable body which preferably forms one piece with the piston operated under the influence of the variable air pressure, changes its position with relation to the over-flow member to be actuated. What has been said in connection with a fuel pump applies also for devices for introducing gases and solid fuels into the explosion chamber of an explosion turbine.

My invention will be better understood in connection with the accompanying drawings which illustrate by way of example two embodiments thereof; in said drawings, Fig. 1 is a diagrammatic view, partly in section, of an explosion turbine provided with mechanism according to the present invention;

Figure 1:
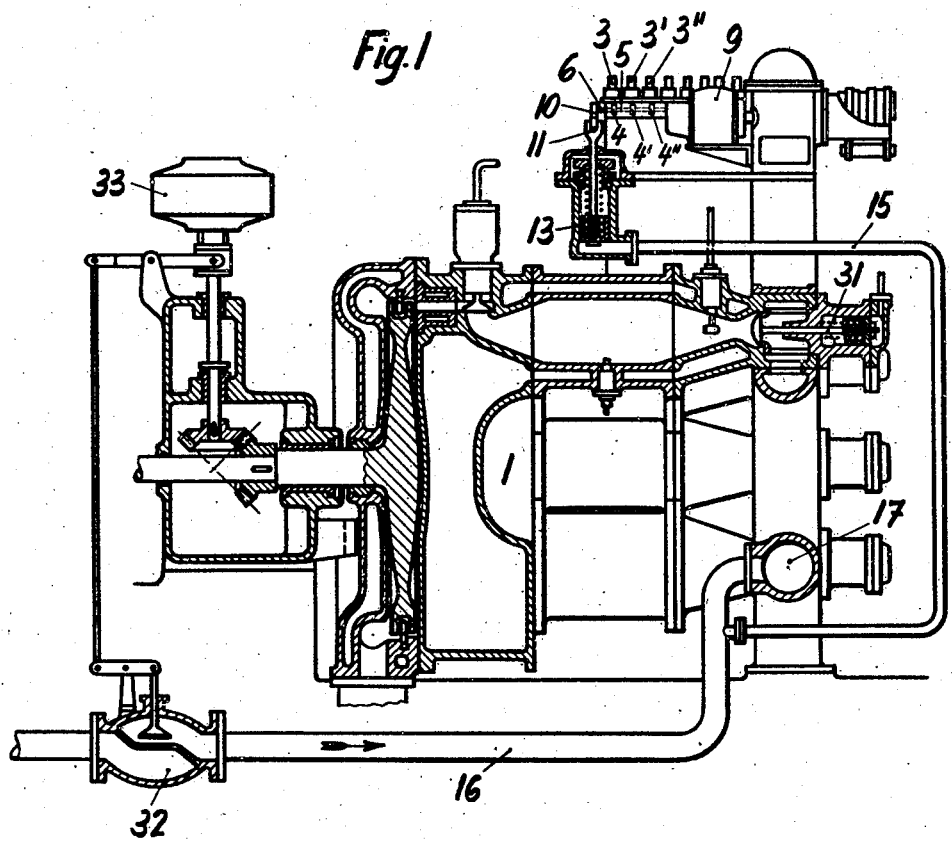
Figure 2:
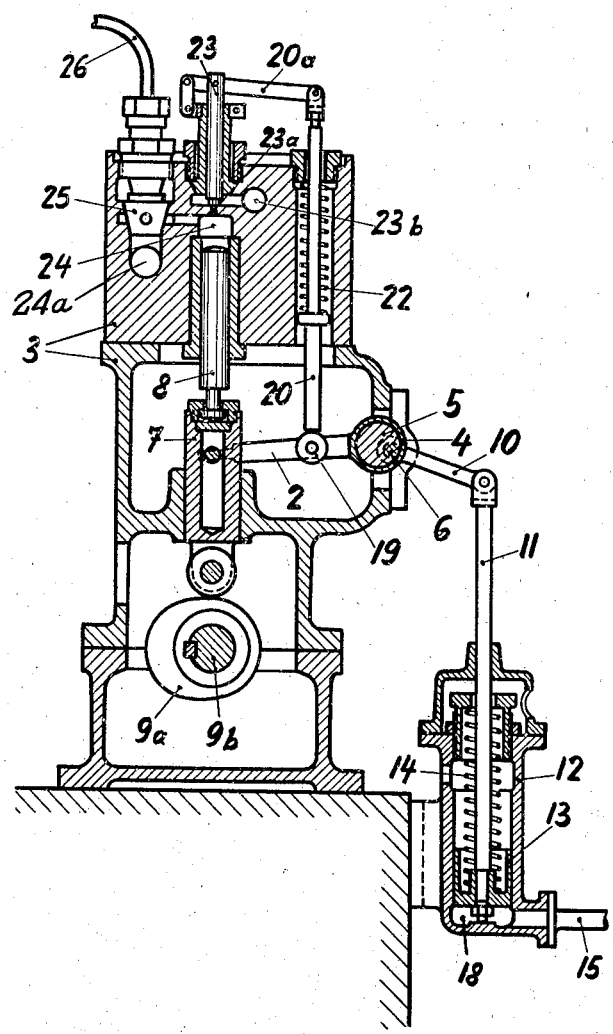
Fig. 2 is an enlarged section through the fuel pump illustrated in Fig. 1.

In Fig. 1 the numeral 1 indicates an explosion oil turbine provided with eight explosion chambers whose operation is to be so regulated in accordance with the invention that by automatic control of the oil feed in dependence upon a controlled variable fluid pressure, such as the pressure of the charging air, or of a regulating oil whose pressure is determined by the speed regulator of the engine, the specific heat content, or the total heat content per unit weight, of the explosive charges formed in the chambers by the separate injection thereinto of air and fuel is maintained substantially constant for all engine speeds within the range of regulation. In the embodiment of the invention disclosed in Figs. 1 and 2, the control of the fuel feed is made dependent upon the pressure of the charging air. This is effected in the following manner:

As shown more clearly in Fig. 2, an oscillating lever 2 forming part of the pump 3 is provided with an eye 4 through which it is journalled upon a shaft 5. The latter is rotatable about the eccentrically positioned pivots or studs 6 at the ends of such shaft (see also Fig. 1), only one such pivot being illustrated. The inner end of the lever 2 is bifurcated and is articulated with the guide 7 of the fuel pump plunger 8 and partakes of the up and down movement of the latter. This movement is effected in known manner by means of cams 9a mounted upon a shaft 9b (Fig. 2) driven by a motor 9 (Fig. 1). The pivots 6, about which the shaft 5 is eccentrically journalled, are rigidly connected with an arm 10 pivoted to a rod 11 which carries a piston 13 movable in a cylinder 12. The piston 13 is at one side under the influence of a compression spring 14 whose pressure may be predetermined, while upon its other side it is under the influence of the charging air pressure through conduit 15. The latter is connected with the conduit 16 which conducts pressure air from a compressor (not shown) to the manifold 17 which supports the housings of the air valve 31. The compressed charging air enters the conduit 16 through a valve 32 which is controlled by the speed regulator 33 of the engine. The space 18 under the piston 13 is thus under the pressure of the charging air.

The oscillating lever 2 carries a roller 19 through which it operates an adjustable rod 20 against the pressure of a spring 22. The upper end of rod 20 is pivoted to a lever 20a whose other end is linked to a fixed part of the machine. The lever 20a is pivotally connected with a piston valve 23 controlling an overflow opening 23a leading from the space 24 above the pump plunger 8 into an overflow well 23b from which any by-passed fuel is returned to the fuel pump. During the suction stroke of the plunger 8, oil is sucked into the space 24 from the supply conduit 24a through a suitable check valve (as shown at 24b in Fig. 3), while upon the pressure stroke of the plunger, the oil is discharged into the conduit 26 through the check valve 25 (shown in greater detail in Fig. 3). The amount of oil forced into the conduit 26 is dependent upon the adjustment of the by-pass mechanism 2, 5, 6, 20.

The operation of the mechanism so far described is as follows: Under the influence of the pressure of the spring 14 on the one side and of the pressure of the charging air on the other, the piston 13 assumes a definite position. The eccentrically mounted shaft 5, which is connected with piston 13 through rod 11 and arm 10, thus also assumes a definite position, so that the lever 2 oscillates about a definite center. Corresponding to the position of this center, the overflow opening 23a opens at definite instants by operation of valve 23 through rod 20, so that predetermined amounts of fuel are charged by the plunger 8 into the valve 25 and fuel conduit 26 leading to the fuel inlet valve of the combustion chamber. By suitable selection of the bore of cylinder 12 and of the strength of spring 14, it becomes possible to insure such feed of fuel at a definite charging air pressure as will maintain the desired specific heat content of the charge, for example, 400 kcal. per cubic meter. As soon as the charging air pressure changes, the position of the piston 13 also changes and consequently also that of the eccentric shaft 5. The other influencing factors, namely, the length of the levers, the eccentricity of the shaft 5, the lever ratio of lever 2, etc., can be so determined that the same specific heat content in the charge is maintained at the different air pressures.

What has been said in connection with pump 3 applies also to the pump 3', 3", etc. of the other explosion chambers. The shaft 5 may be common to all the levers 2 and is adjusted by a single arm 10, piston rod 11 and piston 13 common to all the pumps.

Figure 3:
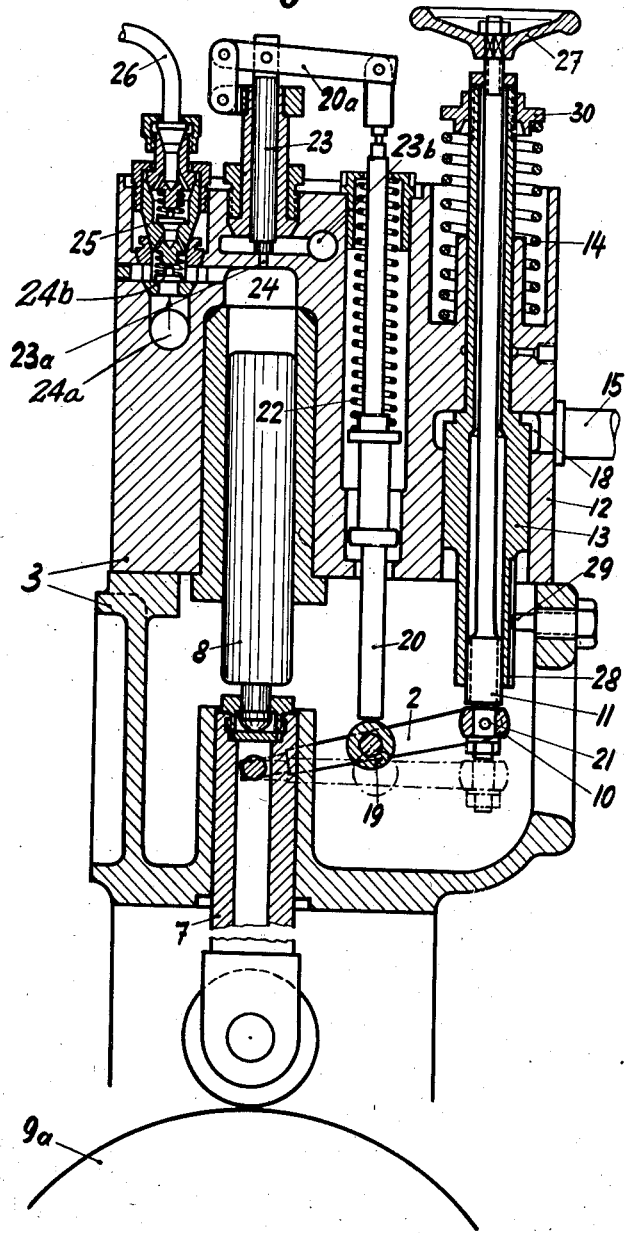
Fig. 3 is a section through a modified form of the invention which represents a simplification of the construction shown in Fig. 1.

Fig. 3 shows a construction which differs from that shown in Fig. 2 in that the adjustable element, i. e. rod 11, under the influence of the variable charging air pressure through the medium of a piston, membrane, etc., does not indirectly displace the center of oscillation of the lever 2 through an eccentric, but directly supports the pivots about which the lever swings. The rod 11 forms one piece with the piston moved directly by the charging air, and is arranged in the fuel pump housing itself. As in Figs. 1 and 2, the numeral 13 indicates the piston which is under the influence of the charging air against the action of the spring 14 and in its movement displaces the center of oscillation 21 about which the lever 2 swings, the range of movement of such center being indicated by the dotted and full line positions thereof. In this manner the instant is predetermined at which the lever 2 effects opening of the overflow or by-pass valve 23 through the rod 20 and lever 20a. At the instant of opening of the by-pass 23a, the space 24 is relieved of pressure, so that the flow of fuel through the check valve 25, which offers a considerable resistance, ceases. Depending upon the position of the piston 13, which varies with the air pressure, a definite quantity of fuel is fed to the chambers, the other influencing factors being so determined that the specific heat content of the explosive charges in the chambers remains constant throughout the range of regulation indicated by the possible linear displacemnt of the center of oscillation 21.

By operation of the handwheel 27 or of a nut 30 bearing on spring 14, the necessary adjustment of the factors influencing the amount of oil that is by-passed may be accomplished. A spline and feather guide 28, 29 prevents rotation of piston 13 upon operation of wheel 27.

It will be understood that my invention is not limited to liquid fuels but may be applied also to the feed of gaseous and pulverulent fuels.

Figure 4:
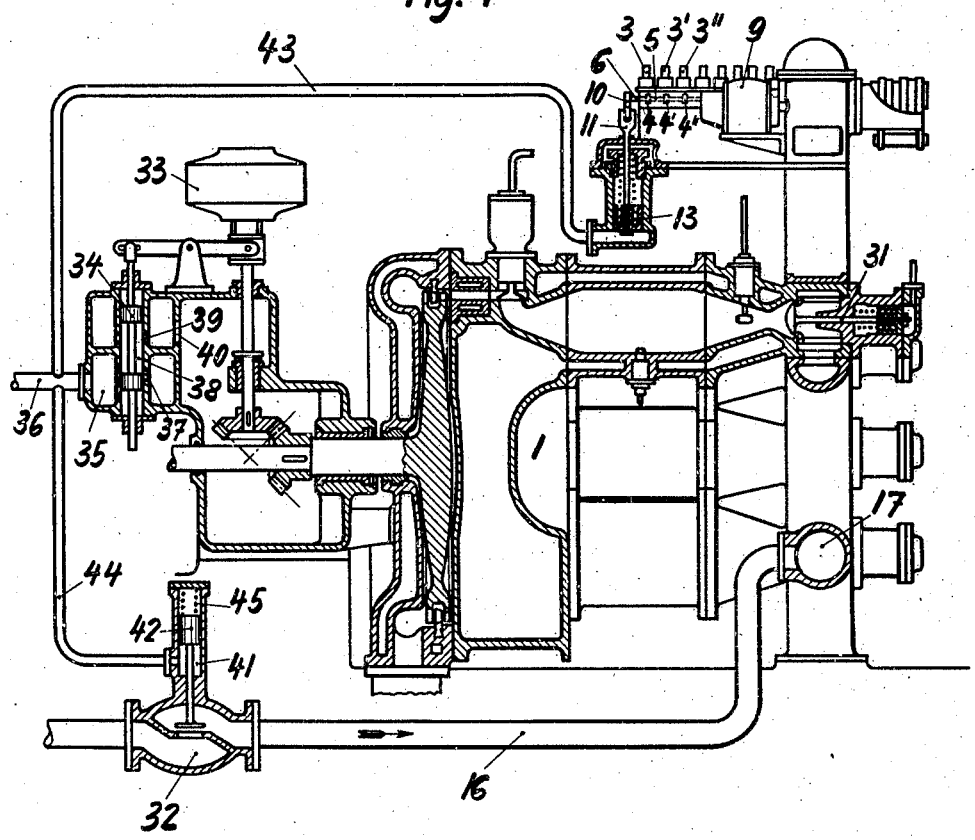
Fig. 4 is a diagrammatic view, partly in section, of a modified form of the invention.

As already indicated, the specific heat content of the explosive charges formed in the chamber may be kept constant not only by varying the fuel feed in dependence upon the pressure of the charging air, but also by regulating the relative quantities of fuel and air in dependence upon the pressure of a third medium, such as a regulating body of oil, whose pressure may be made to depend on the speed of the engine or whose pressure may be varied to regulate the speed of the engine. This may be accomplished by regulating the feed of fuel and air with the aid of adjustable pistons similar to the piston 13, (or of equivalent devices) such piston being under the influence of a circulating stream of regulating oil whose pressure may be varied by means of a throttling valve controlled by the governor of the engine very much in the manner that the governor 33 controls the valve 32. A construction which embodies this feature is shown in Fig. 4. The governor 33 acts on a slide valve 34. Oil at a certain pressure above atmosphere enters the housing 35 of the slide valve through the pipe 36. When the slide valve 34 is moved downwards by the governor 33 the oil pressure in the pipe 36 is released through the openings 37, the space 38 and the openings 39 and 40. According to the position of the slide valve 34 relative to the openings 37 more or less oil is bypassed, and the pressure in the pipe 36 is decreased to a greater or less extent. The space 18 underneath the piston 13 and the space 41 underneath the piston 42 are connected with pipe 36 through the pipes 43 and 44. These pistons are moved by the pressure oil of pipe 36 against the springs 14 and 45 and assume for a definite oil pressure a definite position according to the characteristic of the springs. According to the invention the characteristics of these springs are chosen in such a way that the amount of fuel injected and the amount of air pressed into the explosion chambers will always maintain substantially the same relation as to keep constant the heat content of the mixture. The governor 33 will therefore act simultaneously on the fuel pump and the air valve by means of the pressure oil supplied through the pipe 36 changing the pressure of said oil.

Other variations from the specific constructions illustrated may be resorted to within the scope of the appended claims without departing from the spirit of the invention.

I claim:

1. In a constant volume explosion turbine plant, the combination of a pistonless, constant volume, explosion chamber, mechanism for charging compressed air into the chamber, a piston pump for charging liquid fuel under pressure into said chamber, a conduit between said pump and chamber, a check valve in said conduit adapted to oppose a high resistance to the entry of oil into said conduit, whereby the fuel is introduced at high pressure into the chamber, and mechanism for maintaining substantially constant the total heat content per unit of weight of the explosive charges in the chamber under all conditions of regulation of the plant, comprising a regulating pressure oil circuit associated with said air charging mechanism and said fuel pump and adapted to adjust the feed of air and fuel, and means operative to vary the pressure of said regulating oil in accordance with the regulation of the plant.

2. In a constant volume explosion turbine plant, the combination of a pistonless, constant volume explosion chamber, mechanism for charging compressed air into the chamber, a piston pump for charging liquid fuel under pressure into said chamber, a conduit between said pump and chamber, a check valve in said conduit adapted to oppose a high resistance to the entry of oil into said conduit, whereby the fuel is introduced at high pressure into the chamber, and mechanism for maintaining substantially constant the total heat content per unit of weight of the explosive charges in the chamber under all conditions of regulation of the plant, comprising adjusting means for the pump for controlling the by-passing of the latter portion of a charge sucked in by the pump without substantially affecting the pressure at which the first portion of the charge is ejected by the pump and thereby regulating the quantity of fuel fed by said pump per cycle, said adjusting means including a cylinder, a piston therein, a spring acting on one side of said piston, and means for conducting to the other side of the piston a fluid of superatmospheric pressure whose pressure is proportional to the pressure of the air charged into the explosion chamber in accordance with the condition of regulation of the turbine.

HANS HOLZWARTH.